United States Patent
Kruglick

(10) Patent No.: US 9,406,152 B2
(45) Date of Patent: Aug. 2, 2016

(54) VIEWER OPTIMIZED MODEL COMPRESSION

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/334,465

(22) Filed: Jul. 17, 2014

(65) Prior Publication Data

US 2016/0019714 A1    Jan. 21, 2016

(51) Int. Cl.
*G06T 13/80* (2011.01)
*G06T 9/00* (2006.01)
*G06T 17/10* (2006.01)

(52) U.S. Cl.
CPC .. *G06T 9/00* (2013.01); *G06T 17/10* (2013.01)

(58) Field of Classification Search
None
See application file for complete search history.

(56) References Cited

U.S. PATENT DOCUMENTS

| 8,351,715 | B1* | 1/2013 | Carmichael | G06T 9/001 345/420 |
| 2010/0074321 | A1* | 3/2010 | Beaudreau | H04N 19/115 375/240.01 |
| 2011/0216090 | A1* | 9/2011 | Woo | G09G 5/00 345/633 |
| 2011/0285732 | A1* | 11/2011 | Carter | G06F 17/30153 345/555 |

OTHER PUBLICATIONS

Gobbetti, E., et al., "Adaptive Quad Patches: an Adaptive Regular Structure for Web Distribution and adaptive Rendering of 3D Models," In Proceedings of the 17th International Conference on 3D Web Technology, pp. 9-16 (2012).
Gobbetti, E., et al., "COVRA: A compression-domain output-sensitive volume rendering architecture based on a sparse representation of voxel blocks," Computer Graphics Forum, vol. 31, No. 3, pp. 1315-1324, The Eurographics Association and Blackwell Publishing Ltd.(2012).
Sattler, T., et al., "SCRAMSAC: Improving RANSAC's Efficiency with a Spatial Consistency Filter," IEEE 12th International Conference on Computer Vision (ICCV), pp. 2090-2097, IEEE (2009).
Schnabel, R., et al., "A Parallelly Decodeable Compression Scheme for Efficient Point-Cloud Rendering," Eurographics Symposium on Point-Based Graphics, pp. 11, The Eurographics Association (2007).

(Continued)

*Primary Examiner* — Said Broome
(74) *Attorney, Agent, or Firm* — Turk IP Law, LLC

(57) ABSTRACT

Technologies may be generally described to provide viewer optimized compression of a model. In some examples, a computing device may receive a request to compress a master model for a viewer. The computing device may determine shape primitives of the master model through use of a shape primitive identification technique such as a random sample consensus (RANSAC) technique. The identified or determined shape primitives may be subtracted from the master model to determine residues of the master model. A processed model may be generated from the residues of the master model and the shape primitives. Visible subsets, visible based on a view cone of the viewer, of the residues and the shape primitives may be selected from the processed model, from which a compressed model may be generated. The processed model may then be used to generate a second view without redetermining the shape primitives.

20 Claims, 6 Drawing Sheets

(56) References Cited

OTHER PUBLICATIONS

Schnabel, R., et al., "Efficient RANSAC for Point-Cloud Shape Detection," The Eurographics Association and Blackwell Publishing 2007, pp. 1-12 (2007).

Trivedi, P., et al., "MC-RANSAC: A Pre-processing Model for RANSAC using Monte Carlo method implemented on a GPU," 2013 International Conference on Advances in Computing, Communications and Informatics (ICACCI), pp. 1380-1383, IEEE (2013).

Xu, M., and Lu, J., "Distributed RANSAC for the robust estimation of three-dimensional reconstruction," IET Comput. Vis., vol. 6, Issue 4, pp. 324-333, The Institution of Engineering and Technology, Jan. 2012.

Zhu, M., et al., "Towards Peer-Assisted Rendering in Networked Virtual Environments," MM'11, pp. 1-10, Nov. 28-Dec. 1, 2011.

"Fully automatic feature extraction from point cloud," accessed at https://www.youtube.com/watch?v=42ZKbkjpBbY, Mar. 28, 2012, pp. 2.

Blattman, W., and McQuay, S., "Surface Subdivision Schemes for Python," accessed at https://www.youtube.com/watch?v=ncjybHxXRWg, Aug. 2, 2012, pp. 2.

Iglesias, J-N., "nD image segmentation using learned region agglomeration with the Ray Python library," accessed at https://www.youtube.com/watch?v=cQpExBrh74, Aug. 2, 2012, pp. 2.

\* cited by examiner

VIEWER OPTIMIZED MODEL COMPRESSION

BACKGROUND

Unless otherwise indicated herein, the materials described in the section are not prior art to the claims in the application and are not admitted to be prior art by inclusion in the section.

Various techniques may be used to compress a model that may be provided by data storage services. A three dimensional (3D) model of objects may be compressed based on attributes of a viewer that requests the model. The viewer may decompress the compressed model upon delivery. Available processing resources of the viewer such a graphics processing unit (GPU) may be used to decompress the compressed model.

SUMMARY

The present disclosure generally describes methods, apparatus, systems, devices, and/or computer program products related to providing viewer optimized compression of a model.

According to some examples, methods to provide viewer optimized compression of a model are described. An example method may include receiving a first request to compress a master model for a first viewer; determining shape primitives of the master model; determining residues of the master model by removing the shape primitives from the master model; generating a processed model from the residues and the shape primitives; and generating a first compressed model from a first visible subset of the residues and a first visible subset of the shape primitives from the processed model, based on the first viewer.

According to other examples, a computing device configured to provide viewer optimized compression of a model may be described. The computing device may include a memory configured to store instructions associated with compression of a three dimensional (3D) master model and a processor coupled to the memory. The processor may be configured to receive a first request to compress the 3D master model for a first viewer; determine shape primitives of the 3D master model, where the shape primitives include one or more from a set of: a cylinder, a sphere, a box, a cube, a cone, a pyramid, a prism; determine residues of the 3D master model through a removal of the shape primitives from the 3D master model; generate a processed model from the residues and the shape primitives; generate a first compressed model from a first visible subset of the residues and a first visible subset of the shape primitives from the processed model, based on the first viewer; and use the processed model to generate a second compressed model without redetermining the shape primitives.

According to further examples, a computer-readable storage medium with instructions stored thereon to provide viewer optimized compression of a model is described. The instructions, in response to execution by a processor of a computing device, may cause the processor to perform one or more actions including receive a first request to compress a three dimensional (3D) master model for a first viewer; determine shape primitives of the 3D master model with a random sample consensus (RANSAC) technique, where the shape primitives include one or more from a set of: a cylinder, a sphere, a box, a cube, a cone, a pyramid, a prism; determine residues of the 3D master model through a removal of the shape primitives from the 3D master model; generate a processed model from the residues and the shape primitives; and generate a first compressed model from a first visible subset of the residues and a first visible subset of the shape primitives from the processed model, based on the first viewer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of scope, the disclosure will be described with additional specificity and detail through use of the accompanying drawings, in which:

DETAILED DESCRIPTION

Figure 1:
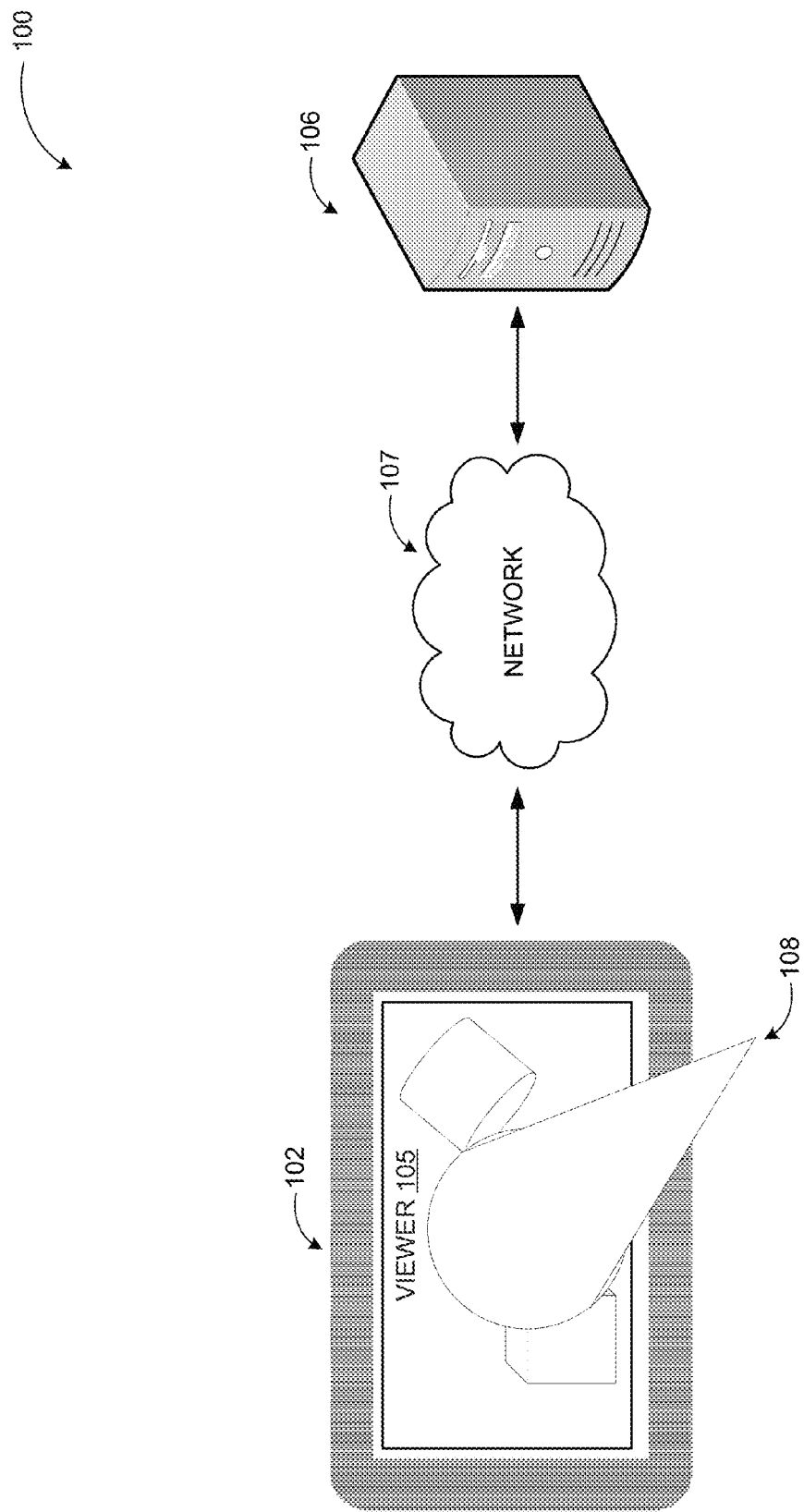
FIG. 1 illustrates an example network environment configured to provide viewer optimized compression of a model.

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, may be arranged, substituted, combined, separated, and designed in a wide variety of different configurations, all of which are explicitly contemplated herein.

The present disclosure is generally drawn, inter alia, to methods, apparatus, systems, devices, and/or computer program products related to providing viewer optimized compression of a model.

Briefly stated, technologies may be generally described to provide viewer optimized compression of a model. In some examples, a computing device may receive a request to compress a master model for a viewer. The computing device may determine shape primitives of the master model through use of a shape primitive identification technique such as a random sample consensus (RANSAC) technique. The identified or determined shape primitives may be subtracted from the master model to determine residues of the master model. A processed model may be generated from the residues of the master model and the shape primitives. Visible subsets, visible based on a view cone of the viewer, of the residues and the shape primitives may be selected from the processed model, from which a compressed model may be generated. The processed model may then be used to generate a second view without redetermining the shape primitives.

Compression, as described herein, may relate to an operation to encode a geometric model which may use fewer bits of data than the original representation of the data. The compression may be lossy or lossless. Lossless data compression may reduce bits of data through identification and may disregard geometric predictability in the data. Lossy data compression may reduce bits of data through identification of unnecessary information in the data and removal of the unnecessary information in the data.

RANSAC, as described herein, may refer to a shape primitive technique that may be configured to perform a detection of shape primitives of data, an extraction of planes from the data, and/or an estimation of a homography from the data, among others. RANSAC may determine a set of inliers from an input data set containing points. Inliers may be data points that fit with a "best model" of the data. A model of inliers may be estimated by repeated withdrawal of samples from the input data set based on the model. A cost function may evaluate the best model to identify inliers by calculation of a distance threshold applied to the model. RANSAC may draw samples of points uniformly and at random from the input data set, where each point may have an identical probability of selection. For each sample of points, a model hypothesis may be created by computation of model parameters from the best model. The quality of the model may be evaluated based on the input data set. If the number of inliers may be greater than the largest number of inliers achieved upon a determination of a previous best model, the inliers and the best model to date may be stored. The process may be repeated and may be terminated when the probability of random samples of points may be free from outliers. Shape primitive techniques similar to RANSAC may include image segmentation, surface subdivision, and least squares fitting, among others.

Image segmentation, as commonly used, may refer to a process used in vision and graphics of partitioning a digital image into multiple pixel segments. The digital image may be a container for a model Graph-cuts may be used for segmentation of objects in the model. Combinatorial graph cut methods in vision may include global optima, practical efficiency, numerical robustness, ability to fuse a wide range of visual cues and constraints, unrestricted topological properties of segments, and applicability to N-D problems. Image segmentation as described here is of the N-D type, where N may be greater than 2, for example 3-D image segmentation performed on a model. Image segmentation may be used to locate objects and boundaries in the model. Additionally, image segmentation may assign labels to the pixels in the model such that the pixels with a same label share similar visual characteristics. The result of image segmentation may be a set of segments which may collectively cover the model, or a set of contours which may be extracted from the model. Each of the pixels in a region may be similar with respect to some characteristic or computed property, such as color, intensity, and texture, among others. Adjacent regions may be different with respect to characteristics including color, intensity, and texture, among others.

Surface subdivision, as described herein, in the field of 3D computer graphics may refer to an approach to represent a smooth surface by the specification of a coarser piecewise linear polygon mesh. The smooth surface may be calculated from the coarse mesh, as the limit of a recursive process of subdividing each polygonal face into smaller faces that may better approximate the smooth surface. Subdivision surfaces may be defined recursively, where the process may start with a given polygonal mesh. A refinement scheme may then be applied to the mesh. The mesh may be taken and subdivided, which may create new vertices and new faces. The positions of the new vertices in the mesh may be computed based on the positions of close older vertices. In some examples, positions of old vertices may be altered. The positions of old vertices may be based on the positions of new vertices. The process may produce a mesh which may be denser than the original mesh. The denser mesh may contain more polygonal faces than the original mesh. As such, the denser mesh may be passed through the refinement scheme again.

Least squares fitting, as described herein, may be used in over-determined systems. Over-determined systems may include sets of equations where there may be more equations than unknowns. Least squares fitting may be used to minimize the sum of the squares of the errors made in results of the equations. The best fit in the least squares sense may minimize the sum of squared residuals. A residual may be a difference between an observed value and a fitting value. When uncertainties may be present in an independent variable, problems may occur in simple regression and least squares methods. For example, the methodology used for fitting errors-in-variables models may be considered instead of least squares. Least squares fitting problems may be linear least squares, ordinary least squares, and non-linear least squares, among others. Least squares fitting may depend on whether or not the residuals are linear in unknowns. The linear least-squares problem may occur in statistical regression analysis, which may include a closed-form solution. A closed-form solution may include any formula that may be evaluated in a finite number of operations. The non-linear problem may have no closed-form solution and may be solved by iterative refinement.

Above examples and definitions are not provided in a limiting sense. Other examples and definitions implementing other schemes and techniques may be used by the embodiments.

FIG. 1 illustrates an example network environment configured to provide viewer optimized compression of a model, arranged in accordance with at least some embodiments described herein.

As shown in a diagram 100, a client device 102 may communicate with a computing device 106 through a network 107. The computing device 106 may provide services, such as one or more applications, data storage, data processing, or comparable ones to the client device 102. The client device 102 may execute a viewer 105 that is configured to display a compressed model that is provided by the computing device 106. An example of the viewer 105 may include a web browser or a game client.

The computing device 106 may also be a component of a datacenter. The datacenter may employ the computing device 106, general purpose devices such as servers, data stores/databases, and special purpose devices such as firewalls, and routers, among others. The computing device 106 may be configured to interact with the client device 102, other client devices, and servers.

The viewer 105 may display the compressed model that is derived by the computing device 106 from a master model in response to a request by the viewer 105 or the client device 102. The request may include a request for the master model which the computing device 106 may interpret as a request to compress the master model into a compressed model and transmit the compressed model.

The master model may be a three dimensional (3D) model that includes or can be at least partly described as shape primitives. The shape primitives may include a cylinder, a sphere, a box, a cube, a cone, a pyramid, a prism, among others.

The computing device 106 may also receive information about a view cone 108 of the viewer 105 as part of the request. The view cone 108 may provide information about a direction of a view or viewing parameters of the model as displayed by the viewer 105. A subset of the primitives in the model may be visible based on the direction of the view cone 108 and a portion of the view cone 108 that intersects a visible surface of the model. Remaining primitives may be hidden behind the subset based on the direction of the view cone 108 or not visible in the specified direction. The view cone 108 may also be used to determine surfaces of the subset that are visible as well as the directions of the subset based on the direction of the view cone 108.

The subset of the shape primitives that are visible and residues (e.g., a difference between the real model and the shape primitives) that are visible may be used to generate a compressed model. The compressed model may be transmitted to the client device 102 for rendering, through the network 107. The decompression and rendering may be a joined operation such as compressed rendering, for example, performed with a GPU programming that performs both operations without requiring the GPU to be reprogrammed in between decompression and rendering. Network resource (e.g., network bandwidth) consumption may be minimized as a result of transmitting the compressed model instead of the master model. A potential network congestion in the network 107 may be prevented by transmitting the compressed model through the network 107 because the compressed model may consume less network resources due to a smaller size compared to the master model. As a result, a potential transmission lag caused by the potential network congestion may be relieved at the network 107.

Figure 2:
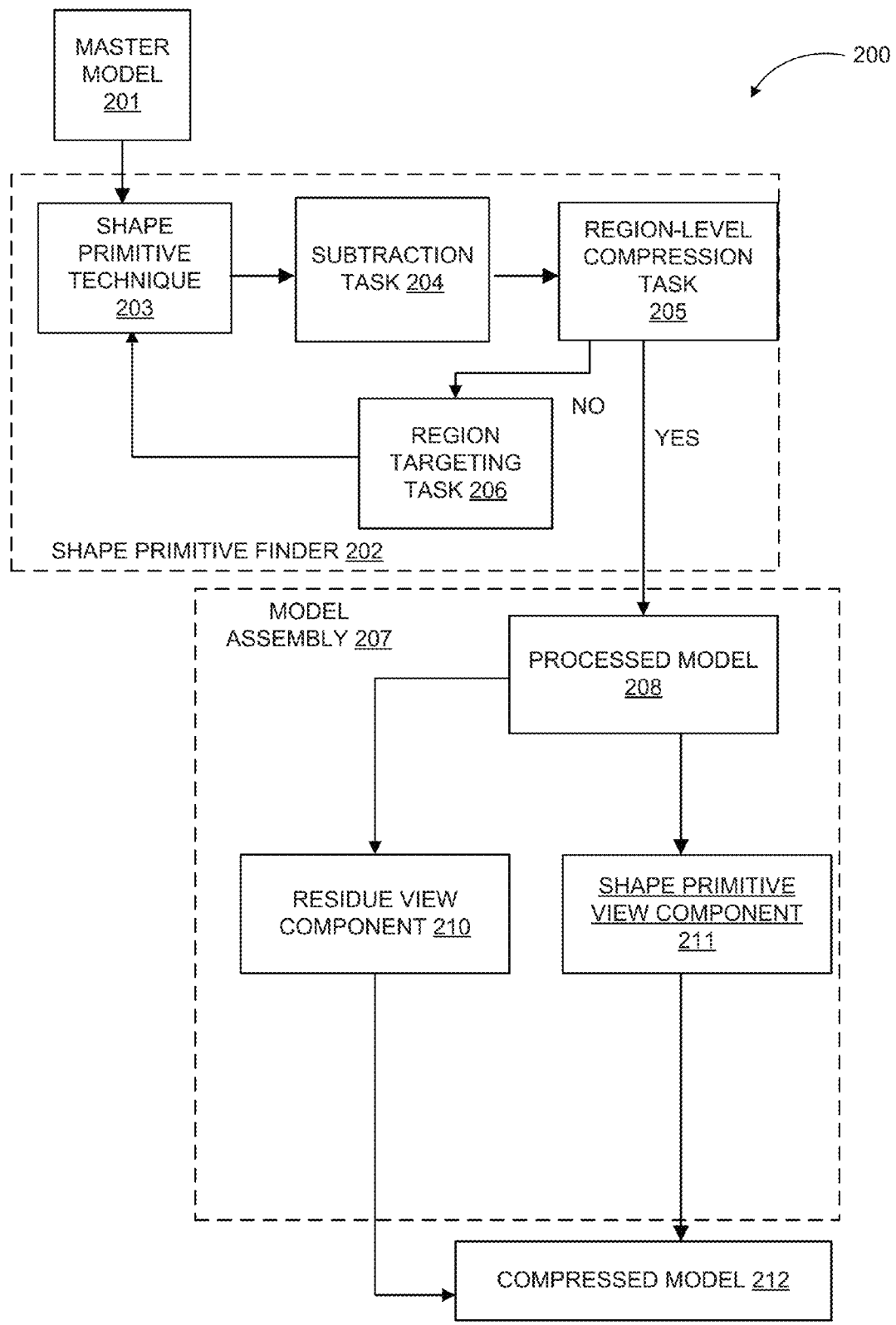
FIG. 2 illustrates an example system configured to provide viewer optimized compression of a model.

FIG. 2 illustrates an example system configured to provide a viewer optimized compression of a model, arranged in accordance with at least some embodiments described herein.

As shown in a diagram 200, a master model 201 may be processed into a compressed model 212. A stand-alone application may complete the tasks of the compression on a computing device. Alternatively, a distributed application may complete the tasks of the compression on multiple computing devices. An example may include execution of tasks associated with finding shape primitives on a first computing device. Tasks associated with assembly of the compressed model 212 may be executed on a second computing device.

The master model 201 may be processed at least partially through a shape primitive finder 202 to determine shape primitives of the master model 201. The shape primitive finder 202 may process the master model 201 through a shape primitive technique 203. The shape primitive technique 203 may include a RANSAC technique that may be used to process the master model 201.

The shape primitives may include one or more of a cylinder, a sphere, a box, a cube, a cone, a pyramid, a prism, among others. The shape primitives may be subtracted from the master model 201 in a subtraction task 204. The subtraction task 204 may result in identification of residues of the master model 201. The residues may include portions of the shape left behind when primitives are removed, background colors, background textures, foreground colors, foreground textures, among others.

The residues may be further processed through a region-level compression task 205 to determine whether the residues conform to a region-level compression target. The residues are numbers (e.g. floats), for example an amplitude along the normal vector to displace from the primitives to arrive at the master model. The region-level compression target may be a static value or a dynamic value. In an example, the region-level compression may be set to a static value such as 3× to generate a compressed model 212 that is 3× less in size than the master model 201. Alternatively, the region-level compression may be determined dynamically based on multiple attributes of a system for viewer optimized compression of a model. For example, such a system may include multiple computers (one or more servers and client devices) communicatively coupled over one or more networks with each device performing one or more tasks associated with the viewer optimized compression of the model. The attributes may include network bandwidth limitations that limit available network bandwidth to transmit the compressed model 212. In an example, the region-level compression value may be related inversely with available resources associated with the compressed model 212. An increase in the available resources such as the available network bandwidth may lead to a decrease in the region-level compression value. A decrease in the available resources may lead to an increase in the region-level compression value used to evaluate and process the residues.

In response to a determination of a divergence from the region-level compression of the residues of the master model 201, the residues may be partitioned to sub-regions at a region targeting task 206. The loop (203-204-205-206-203) may be performed at the region level. Region level compression may be evaluated for each region. A region may be a set of model features. For example, a set of unchanging features in the background may be one region that is suitable for more compression while moving or changing model features such as figures of people may be subjected to less compression because the compression effort may not pay off as well. A compression level of a subset of the residues associated with each one of the sub-regions may be optimized based on the region-level compression. Optimization may include additional processing of the subset of the residues through the shape primitive technique 203 to find additional shape primitives that may have been missed in the initial execution to find the shape primitives. An example subsequent execution of the shape primitive finder 202 may increase a complexity value of the shape primitive technique 203 to process the subset of the residues with a finer granularity to find the additional shape primitives. The additional shape primitives may be subtracted from the residues of the master model 201 through the subtraction task 204 to conform the residues to the region-level compression at a subsequent evaluation of the residues at the region-level compression task 205.

The compressed model 212 may be generated at a model assembly 207. The shape primitives and the residues may be combined to generate a processed model 208. The processed model 208 may be un-composited. A residue view component 210 may process the residues in the processed model 208 to select a visible subset of the residues based on a viewer. Information about the viewer may be provided by a client device that hosts the viewer through a request for the compressed model 212. The information about the viewer may include a view cone that may be used to determine a visible surface of the master model 201 to be displayed in the viewer. The visible surface may be determined based on a direction of the view cone and a visible surface of the master model 201 that intersects the base of the view cone.

Similarly, the shape primitives may be processed through a shape primitive view component 211 to select a visible subset of the shape primitives based on the view cone. The direction of the view cone may be used to determine a visible surface of the master model 201 that intersects a base of the view cone. The shape primitive view component 211 may select a visible subset of the shape primitives that are associated with the visible surface to generate the compressed model 212.

The compressed model 212 may be generated by combining the visible subset of the shape primitives and the residues. The direction and location of the visible subset of the shape primitives and the residues may be recorded within the compressed model 212 to allow for recreating a visible surface of the master model 201 based on the view cone at a rendering time of the compressed model 212.

Figure 3:
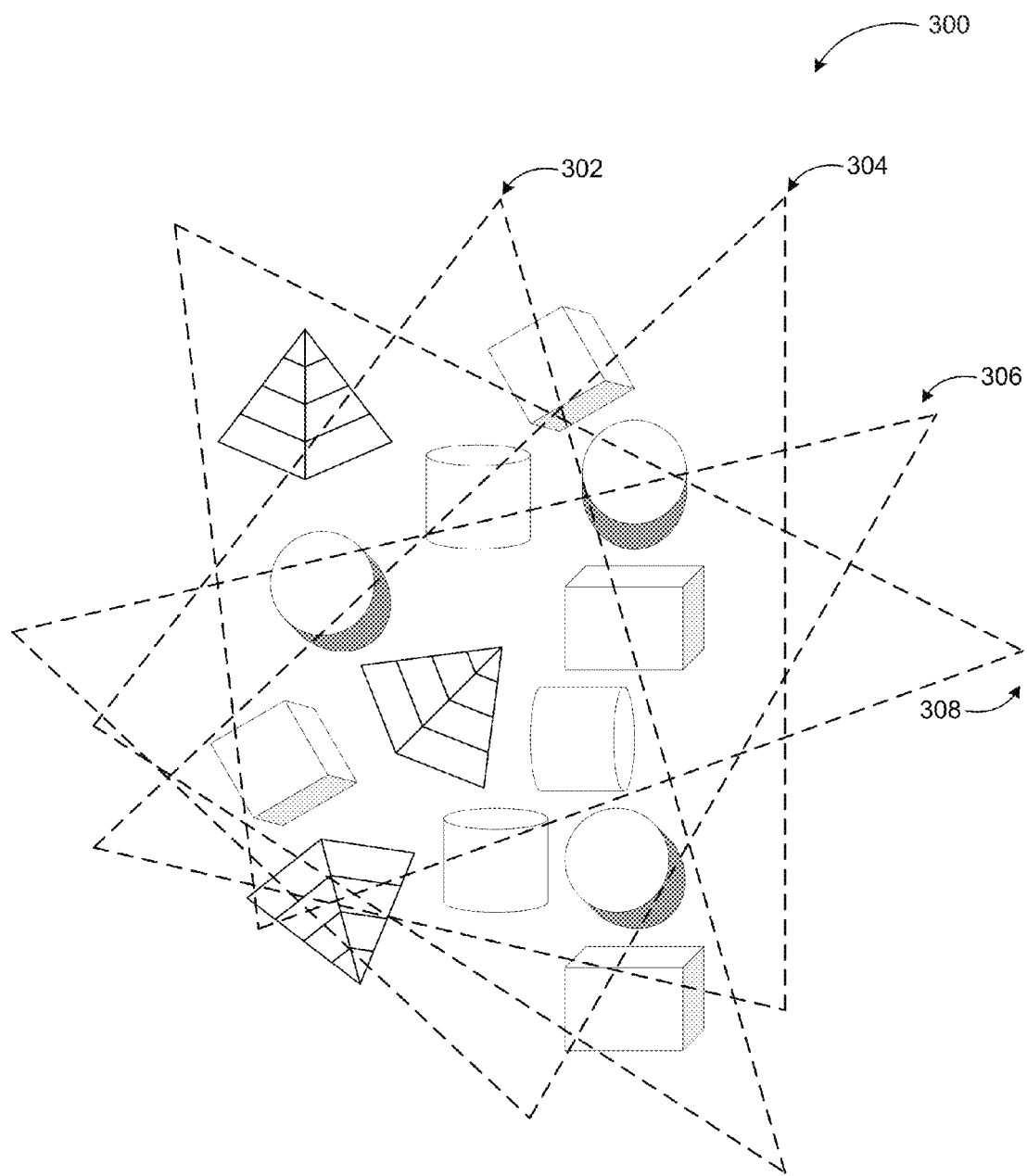
FIG. 3 illustrates a conceptual example of a computing device that identifies shape primitives of a three dimensional (3D) master model.

FIG. 3 illustrates a conceptual example of a computing device that identifies shape primitives of a 3D model, arranged in accordance with at least some embodiments described herein.

As shown in a diagram 300, a master model may be displayed with shape primitives. The master model may be processed to determine shape primitives and residues. A visible subset of the shape primitives and the residues may be selected to generate compressed models based on viewers associated with view cones (302, 304, 306, and 308). The directions and bases of the view cones (302, 304, 306, and 308) that intersect visible surfaces of the master model may be used to select the visible subsets of the shape primitives and the residues.

Conventional techniques to compress a master model may have a complexity of O(r*n) for n viewers. The conventional techniques may have the relatively higher complexity because primitives may be derived from the master model for each compression request based on a viewer. A shape primitive finder based technique, according to some embodiments, may have a complexity of O(r). The shape primitive finder technique may have a low complexity compared to the conventional techniques because the shape primitive finder may process the master model once to determine at least some shape primitives and residues and then reuse those shape primitives for multiple compressed models seen from different views. A visible subset of the shape primitives and the residues may be selected to generate the compressed model for each compression request.

The examples in FIGS. 1 through 3 have been described using specific systems and processes in which viewer optimized compression of a model may be implemented. Embodiments for providing viewer optimized compression of a model are not limited to the systems and processes according to these examples.

Figure 4:
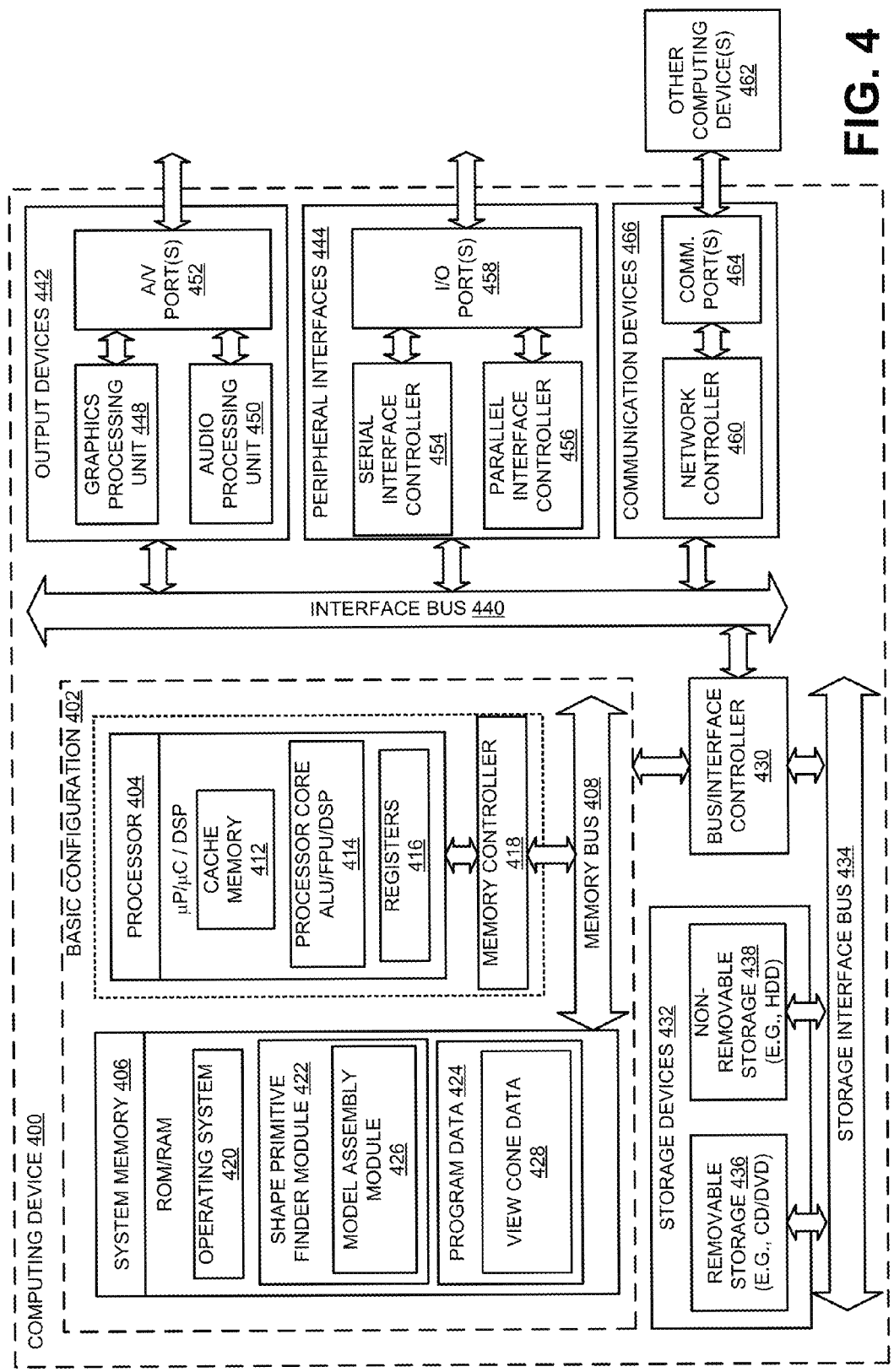
FIG. 4 illustrates a general purpose computing device, which may be configured to provide viewer optimized compression of a model.

FIG. 4 illustrates a general purpose computing device, which may be configured to provide viewer optimized compression of a model, arranged in accordance with at least some embodiments described herein.

For example, the computing device 400 may be used to compress a master model. In an example of a basic configuration 402, the computing device 400 may include one or more processors 404 and a system memory 406. A memory bus 408 may be used for communication between the processor 404 and the system memory 406. The basic configuration 402 may be illustrated in FIG. 4 by those components within the inner dashed line.

Depending on the desired configuration, the processor 404 may be of any type, including, but not limited to, a microprocessor ($\mu$P), a microcontroller ($\mu$C), a digital signal processor (DSP), or any combination thereof. The processor 404 may include one more levels of caching, such as a cache memory 412, a processor core 414, and registers 416. The processor core 414 may include an arithmetic logic unit (ALU), a floating point unit (FPU), a digital signal processing core (DSP Core), or any combination thereof. A memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, a shape primitive finder module 422, a model assembly module 426, and a program data 424. The shape primitive finder module 422 may determine shape primitives and residues from a master model. The model assembly module 426 may generate a compressed model from visible subsets of the shape primitives and the residues. The program data 424 may include, among other data, the view cone data 428, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDD), optical disk drives such as compact disc (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436, and the non-removable storage devices 438 may be examples of computer storage media. Computer storage media may include, but may not be limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 may include a graphics processing unit 448 and an audio processing unit 450, which may be configured to communicate to various external devices, such as a display or speakers via one or more A/V ports 452. One or more example peripheral interfaces 444 may include a serial interface controller 454 or a parallel interface controller 456, which may be configured to communicate with external devices, such as input devices (for example, keyboard, mouse, pen, voice input device, touch input device, etc.) or other peripheral devices (for example, printer, scanner, etc.) via one or more I/O ports 458. An example communication device 466 may include a network controller 460, which may be arranged to facilitate communications with one or more other computing devices 462 over a network communication link via one or more communication ports 464. The one or more other computing devices 462 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 400 may be implemented as a part of a general purpose or specialized server, mainframe, or similar computer, which includes any of the above functions. The computing device 400 may also be implemented as a personal computer including both laptop computer and non-laptop computer configurations.

Example embodiments may also include viewer optimized compression of a model. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 5:
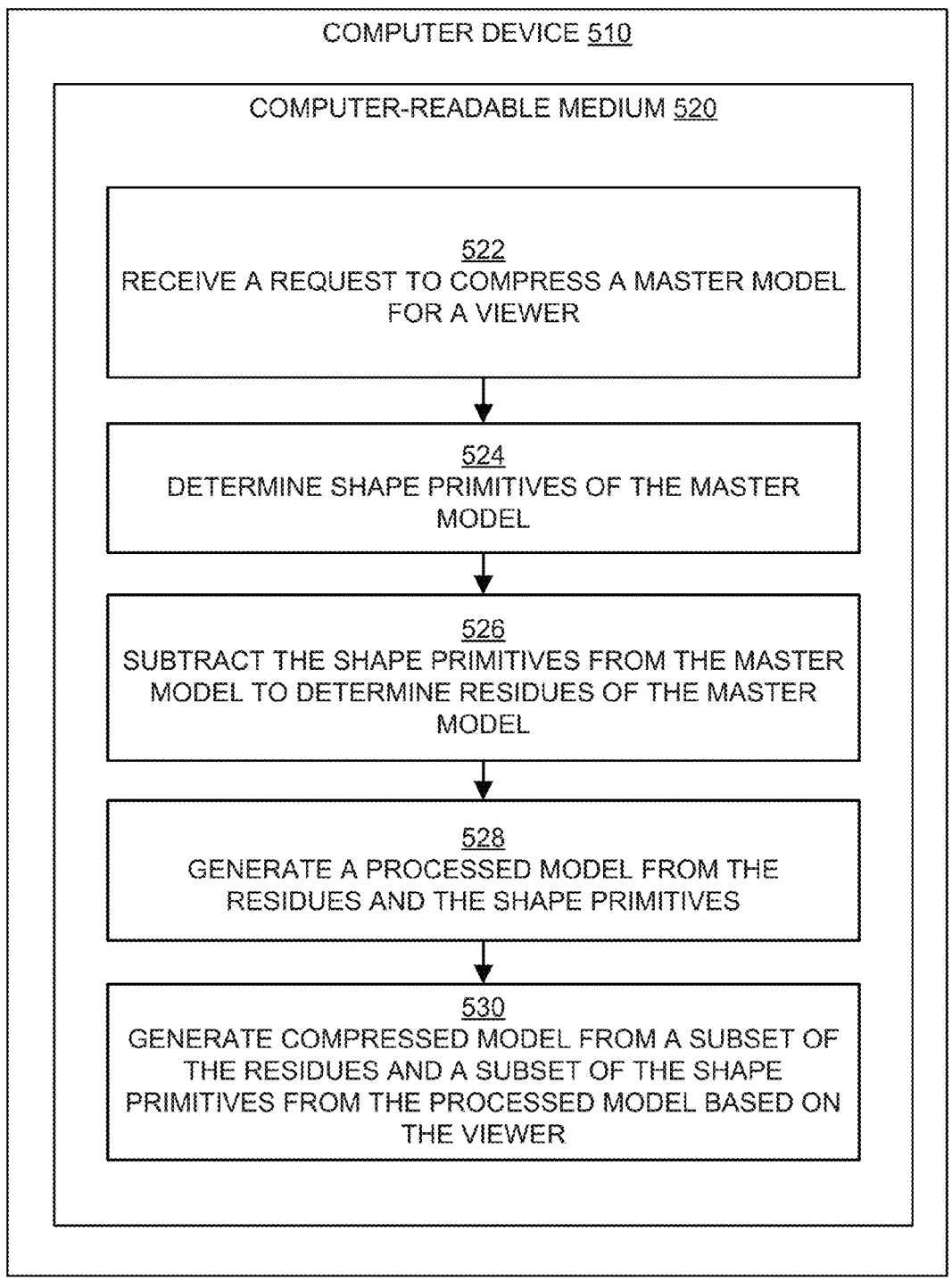
FIG. 5 is a flow diagram illustrating an example method to provide viewer optimized compression of a model which may be performed or otherwise controlled by a computing device such as the computing device in FIG. 4.

FIG. 5 is a flow diagram illustrating an example method to provide a viewer optimized compression of a model which may be performed or otherwise controlled by a computing device such as the computing device in FIG. 4, arranged in accordance with at least some embodiments described herein.

Example methods may include one or more operations, functions, or actions as illustrated by one or more of blocks 522, 524, 526, 528, and 530 and may, in some embodiments, be performed by a computing device such as the computing device 400 in FIG. 4. The operations described in the blocks 522-530 may also be stored as computer-executable instructions in a computer-readable medium such as a computer-readable medium 520 of a computing device 510.

An example process for providing viewer optimized compression of a model, may begin with block 522, "RECEIVE A REQUEST TO COMPRESS A MASTER MODEL FOR A VIEWER," where the computing device 400 may receive the request which may include information about a view cone of the viewer.

Block 522 may be followed by block 524, "DETERMINE SHAPE PRIMITIVES OF THE MASTER MODEL," where the master model may be processed with a shape primitive finder technique such as a RANSAC technique.

Block 524 may be followed by block 526, "SUBTRACT THE SHAPE PRIMITIVES FROM THE MASTER MODEL TO DETERMINE RESIDUES OF THE MASTER MODEL," where the residues such as background and foreground colors and textures may be determined as a result of the subtraction of the shape primitives.

Block 526 may be followed by block 528, "GENERATE A PROCESSED MODEL FROM THE RESIDUES AND THE SHAPE PRIMITIVES," where the processed model may be un-composited.

Block 528 may be followed by block 530, "GENERATE COMPRESSED MODEL FROM A SUBSET OF THE RESIDUES AND A SUBSET OF THE SHAPE PRIMITIVES FROM THE PROCESSED MODEL BASED ON THE VIEWER," where the compressed model may be generated from a selection of a visible subset of the shape primitives and the residues based on a view cone of the viewer. The processed model may then be used to generate a second view without redetermining the shape primitives.

Figure 6:
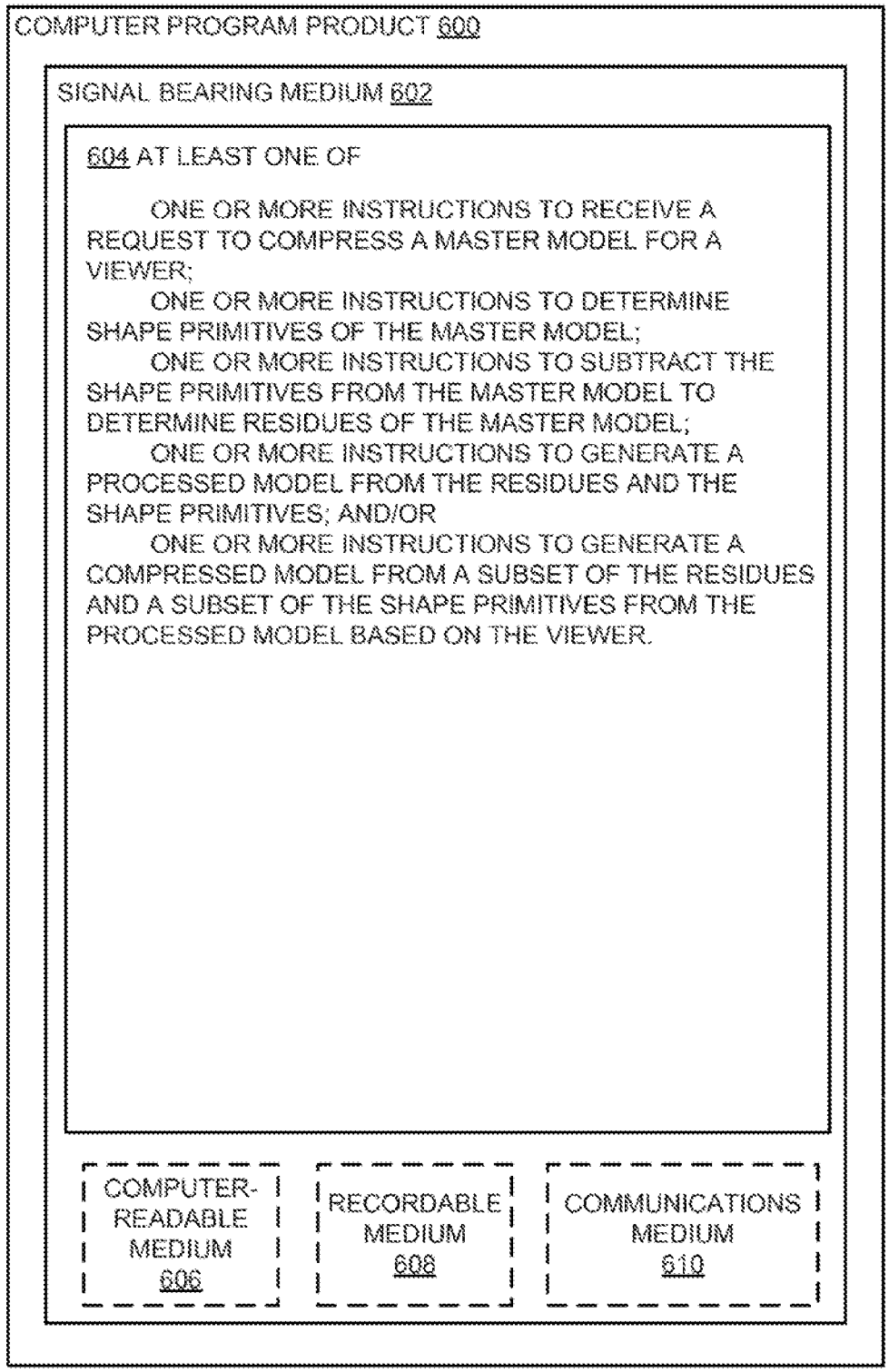
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, a computer program product 600 may include a signal bearing medium 602 that may also include one or more machine readable instructions 604 that, when executed by, for example, a processor, may provide the functionality described herein. For example, referring to the processor 404 in FIG. 4, the shape primitive finder module 422 and the model assembly module 426 may undertake one or more of the tasks shown in FIG. 6 in response to the instructions 604 conveyed to the processor 404 by the signal bearing medium 602 to provide viewer optimized compression of a model, as described herein. Some of those instructions may include, for example, receiving a request to compress a master model for a viewer, determining shape primitives of the master model, subtracting the shape primitives from the master model to determine residues of the master model, generating a processed model from the residues and the shape primitives, and generating a compressed model from a subset of the residues and a subset of the shape primitives from the processed model, based on the viewer, according to some embodiments described herein. The processed model may then be used to generate a second view without redetermining the shape primitives.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). For example, the computer program product 600 may be conveyed to one or more modules of the processor, where the processor may execute the one or more machine readable instructions 604 by an RF signal bearing medium, where the signal bearing medium 602 may be conveyed by the wireless communications medium 610 (e.g., a wireless communications medium conforming with the IEEE 802.11 standard).

According to some examples, methods to provide viewer optimized compression of a model are described. An example method may include receiving a first request to compress a master model for a first viewer; determining shape primitives of the master model; determining residues of the master model by removing the shape primitives from the master model; generating a processed model from the residues and the shape primitives; and generating a first compressed model from a first visible subset of the residues and a first visible subset of the shape primitives from the processed model, based on the first viewer.

According to other examples, the method may include selecting the first visible subset of the residues and the first visible subset of the shape primitives based on a first view cone of the first viewer and using the processed model to generate a second view without redetermining the shape primitives. The method may also include receiving a second request to compress the master model for a second viewer and generating a second compressed model from a second visible subset of the residues and a second visible subset of the shape primitives from the processed model, based on the second viewer.

According to further examples, the method may further include selecting the second visible subset of the residues based on a second view cone of the second viewer and selecting the second visible subset of the shape primitives based on the second view cone of the second viewer. The shape primitives may include one or more from a set of: a cylinder, a sphere, a box, a cube, a cone, a pyramid, a prism and wherein, the master model is a three dimensional (3D) model. The method may also include determining the shape primitives comprises use of a random sample consensus (RANSAC) technique.

According to yet other examples, the method may include determining the shape primitives at a region level and evaluating a region-level compression for each region, wherein each region comprises a set of model features. Regions may be defined based on a changing characteristic of the set of model features. The method may also include in response to a determination of a divergence from the region-level compression of the residues of the master model, partitioning the residues to sub-regions. The method may further include optimizing a compression level of a subset of the residues associated with each one of the sub-regions based on the region-level compression.

According to other examples, a computing device configured to provide viewer optimized compression of a model may be described. The computing device may include a memory configured to store instructions associated with compression of a three dimensional (3D) master model and a processor coupled to the memory. The processor may be configured to receive a first request to compress the 3D master model for a first viewer; determine shape primitives of the 3D master model, where the shape primitives include one or more from a set of: a cylinder, a sphere, a box, a cube, a cone, a pyramid, a prism; determine residues of the 3D master model through a removal of the shape primitives from the 3D master model; generate a processed model from the residues and the shape primitives; generate a first compressed model from a first visible subset of the residues and a first visible subset of the shape primitives from the processed model, based on the first viewer; and use the processed model to generate a second compressed model without redetermining the shape primitives.

According to some examples, the processor may be further configured to select the first visible subset of the residues based on a first view cone of the first viewer and select the first visible subset of the shape primitives based on the first view cone of the first viewer. The processor may also be further configured to receive a second request to compress the 3D master model for a second viewer; and generate a second compressed model from a second visible subset of the residues and a second visible subset of the shape primitives from the processed model, based on the second viewer. The processor may be further configured to select the second visible subset of the residues based on a second view cone of the second viewer and select the second visible subset of the shape primitives based on the second view cone of the second viewer.

According to yet other examples, the processor may be further configured to determine the shape primitives with a random sample consensus (RANSAC) technique; determine the shape primitives at a region level; and evaluate a region-level compression for each region, wherein each region comprises a set of model features. Each region may be defined based on a changing characteristic of the set of model features. The processor may also be configured to in response to a determination of a divergence from the region-level compression of the residues of the master model, partition the residues to sub-regions; and optimize a compression level of a subset of the shape primitives associated with each one of the sub-regions based on the region-level compression.

According to further examples, a computer-readable storage medium with instructions stored thereon to provide viewer optimized compression of a model is described. The instructions, in response to execution by a processor of a computing device, may cause the processor to perform one or more actions including receive a first request to compress a three dimensional (3D) master model for a first viewer; determine shape primitives of the 3D master model with a random sample consensus (RANSAC) technique, where the shape primitives include one or more from a set of: a cylinder, a sphere, a box, a cube, a cone, a pyramid, a prism; determine residues of the 3D master model through a removal of the shape primitives from the 3D master model; generate a processed model from the residues and the shape primitives; and generate a first compressed model from a first visible subset of the residues and a first visible subset of the shape primitives from the processed model, based on the first viewer.

According to some examples, the instructions may further cause the processor to select the first visible subset of the residues based on a first view cone of the first viewer and select the first visible subset of the shape primitives based on the first view cone of the first viewer. The instructions may also cause the processor to receive a second request to compress the 3D master model for a second viewer; select a second visible subset of the residues based on a second view cone of the second viewer; select a second visible subset of the shape primitives based on the second view cone of the second viewer; and generate a second compressed model from the second visible subset of the residues and the second visible subset of the shape primitives from the processed model. The instructions may further cause the processor to determine the shape primitives at a region level; evaluate a region-level compression for each region, wherein each region comprises a set of model features; in response to a determination of a divergence from the region-level compression of the residues of the master model, partition the residues to sub-regions; and optimize a compression level of a subset of the shape primitives associated with each one of the sub-regions based on the region-level compression.

There is little distinction left between hardware and software implementations of aspects of systems; the use of hardware or software is generally (but not all of the time, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of the disclosure.

The present disclosure is not to be limited in terms of the particular embodiments described in the application, which are intended as illustrations of various aspects. Many modifications and variations may be made without departing from the spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited by the terms of the appended claims, along with the full scope of equivalents to which such claims are entitled. It is to be understood that the disclosure is not limited to particular methods, reagents, compounds compositions or biological systems, which may, of course, vary. It is also to be understood that the terminology used herein is for the purpose of describing particular embodiments, and is not intended to be limiting.

In addition, those skilled in the art will appreciate that the mechanisms of the subject matter described herein are capable of being distributed as a program product in a variety of forms and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those found in data computing/communication and/or network computing/communication systems. The herein described subject matter sometimes illustrates different components contained within, or connected with, other different components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include, but are not limited to, physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or the application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a computing device to provide viewer optimized compression of a model, the method comprising:
   receiving a first request to compress a master model for a first viewer;
   determining shape primitives of the master model;
   determining residues of the master model by removing the shape primitives from the master model;
   generating a processed model from the residues and the shape primitives;
   selecting a first visible subset of the residues and a first visible subset of the shape primitives based on a first view cone of the first viewer; and
   generating a first compressed model from the first visible subset of the residues and the first visible subset of the shape primitives from the processed model, based on the first viewer.

2. The method of claim 1, further comprising:
   using the processed model to generate a second view without re-determining the shape primitives.

3. The method of claim 1, further comprising:
   receiving a second request to compress the master model for a second viewer; and
   generating a second compressed model from a second visible subset of the residues and a second visible subset of the shape primitives from the processed model, based on the second viewer.

4. The method of claim 3, further comprising:
   selecting the second visible subset of the residues based on a second view cone of the second viewer; and
   selecting the second visible subset of the shape primitives based on the second view cone of the second viewer.

5. The method of claim 1, wherein the shape primitives include one or more from a set of: a cylinder, a sphere, a box, a cube, a cone, a pyramid, a prism and wherein, the master model is a three dimensional (3D) model.

6. The method of claim 1, further comprising:
   determining the shape primitives comprises use of a random sample consensus (RANSAC) technique.

7. The method of claim 1, further comprising:
   determining the shape primitives at a region level; and
   evaluating a region-level compression for each region, wherein each region comprises a set of model features.

8. The method of claim 7, wherein regions are defined based on a changing characteristic of the set of model features.

9. The method of claim 7, further comprising:
   in response to a determination of a divergence from the region-level compression of the residues of the master model, partitioning the residues to sub-regions.

10. The method of claim 9, farther comprising:
    optimizing a compression level of a subset of the residues associated with each on the sub-regions based on the region-level compression.

11. A computing device configured to provide viewer optimized compression of a model, the computing device comprising:
    a memory configured to store instructions associated with compression of a three dimensional (3D) master model; and
    a processor coupled to the memory, wherein the processor is configured to:
       receive a first request to compress the 3D master model for a first viewer;
       determine shape primitives of the 3D master model, wherein the shape primitives include one or more from a set of a cylinder, a sphere, a box, a cube, a cone, a pyramid, a prism;
       determine residues of the 3D master model through a removal of the shape primitives from the 3D master model;
       generate a processed model from the residues and the shape primitives;
       select a first visible subset of the residues based on a first view cone of the first viewer;
       select a first visible subset of the shape primitives based on the first view cone of the first viewer;
       generate a first compressed model from the first visible subset of the residues and the first visible subset of the shape primitives from the processed model, based on the first viewer; and
       use the processed model to generate a second compressed model without re-determining the shape primitives.

12. The computing device of claim 11, wherein the processor is further configured to:
    receive a second request to compress the 3D master model for a second viewer; and generate a second compressed model from a second visible subset of the residues and a second visible subset of the shape primitives from the processed model, based on the second viewer.

13. The computing device of claim 12, wherein the processor is further configured to:
select the second visible subset of the residues based on a second view cone of the second viewer; and
select the second visible subset of the shape primitives based on the second view cone of the second viewer.

14. The computing device of claim 11, wherein the processor is further configured to:
determine the shape primitives with a random sample consensus (RANSAC) technique.

15. The computing device of claim 11, wherein the processor is further configured to:
determine the shape primitives at a region level; and
evaluate a region-level compression for each region, wherein each region comprises a set of model features.

16. The computing device of claim 15, wherein each region is defined based on a changing characteristic of the set of model features.

17. The computing device of claim 15, wherein the processor is further configured to:
in response to a determination of a divergence from the region-level compression of the residues of the master model, partition the residues to sub-regions; and
optimize a compression level of a subset of the shape primitives associated with each one of the sub-regions based on the region-level compression.

18. A non-transitory computer-readable storage medium with instructions stored thereon to provide viewer optimized compression of a model, the instructions, in response to execution by a processor of a computing device, causing the processor to one or more actions comprising:
receive a first request to compress a three dimensional (3D) master model for a first viewer;
determine shape primitives of the 3D master model with a random sample consensus (RANSAC) technique, wherein the shape primitives include one or more from a set of: a cylinder, a sphere, a box, a cube, a cone, a pyramid, a prism;
determine residues of the 3D master model through a removal of the shape primitives from the 3D master model;
generate a processed model from the residues and the shape primitives;
select a first visible subset of the residues based on a first view cone of the first viewer;
select a first visible subset of the shape primitives based on the first view cone of the first viewer; and
generate a first compressed model from the first visible subset of the residues and the first visible subset of the shape primitives from the processed model, based on the first viewer.

19. The non-transitory computer-readable storage medium of claim 18, wherein the instructions further cause the processor to:
receive a second request to compress the 3D master model for a second viewer;
select a second visible subset of the residues based on a second view cone of the second viewer;
select a second visible subset of the shape primitives based on the second view cone of the second viewer; and
generate a second compressed model from the second visible subset of the residues and the second visible subset of the shape primitives from the processed model.

20. The non-transitory computer-readable storage medium of claim 18, wherein the instructions further cause the processor to:
determine the shape primitives at a region level;
evaluate a region-level compression for each region, wherein each region comprises a set of model features;
in response to a determination of a divergence from the region-level compression of the residues of the master model, partition the residues to sub-regions, and
optimize a compression level of a subset of the shape primitives associated with each one of the sub-regions based on the region-level compression.

* * * * *